United States Patent
Choi et al.

(10) Patent No.: US 10,147,940 B2
(45) Date of Patent: Dec. 4, 2018

(54) ELECTRODE ACTIVE MATERIAL, PREPARATION METHOD THEREOF, AND ELECTRODE AND LITHIUM BATTERY CONTAINING THE SAME

(75) Inventors: Won-chang Choi, Yongin-si (KR); Jin-hwan Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1010 days.

(21) Appl. No.: 13/461,311

(22) Filed: May 1, 2012

(65) Prior Publication Data

US 2012/0282521 A1    Nov. 8, 2012

(30) Foreign Application Priority Data

May 4, 2011    (KR) .................. 10-2011-0042623

(51) Int. Cl.
  *H01M 4/58*  (2010.01)
  *H01M 4/36*  (2006.01)
  *C01G 45/12*  (2006.01)
  *C01G 51/00*  (2006.01)
  *C01G 53/00*  (2006.01)
  *H01M 4/131*  (2010.01)
  *H01M 4/1391*  (2010.01)
  *H01M 4/505*  (2010.01)
  *H01M 10/052*  (2010.01)
  *B05D 5/12*  (2006.01)

(52) U.S. Cl.
  CPC ........ *H01M 4/366* (2013.01); *C01G 45/1228* (2013.01); *C01G 51/50* (2013.01); *C01G 53/50* (2013.01); *H01M 4/131* (2013.01); *H01M 4/1391* (2013.01); *H01M 4/505* (2013.01); *H01M 10/052* (2013.01); *C01P 2004/80* (2013.01); *C01P 2006/40* (2013.01)

(58) Field of Classification Search
  CPC ..................................... H01M 4/505
  See application file for complete search history.

(56) References Cited

U.S. PATENT DOCUMENTS

| | | |
|---|---|---|
| 6,641,955 B1 | 11/2003 | Matsubara et al. |
| 8,080,335 B2 | 12/2011 | Kawakami et al. |
| 9,077,024 B2 | 7/2015 | Ogasawara et al. |

(Continued)

FOREIGN PATENT DOCUMENTS

| | | |
|---|---|---|
| CA | 2 373 756 A1 | 11/2000 |
| CN | 1505847 A | 6/2004 |

(Continued)

OTHER PUBLICATIONS

Li, Xifei, and Youlong Xu. "Enhanced Cycling Performance of Spinel LiMn2O4 Coated with ZnMn2O4 Shell." SpringerLink. Journal of Solid State Electrochemistry, Oct. 23, 2007.*

(Continued)

*Primary Examiner* — Stephan J Essex
(74) *Attorney, Agent, or Firm* — Cantor Colburn LLP

(57) ABSTRACT

An electrode active material, a method of manufacturing the same, and an electrode and a lithium battery adopting the same. The electrode active material includes a core capable of occluding and emitting lithium; and a surface treatment layer formed on at least a portion of a surface of the core, wherein the surface treatment layer includes a lithium-free oxide having a spinel structure.

22 Claims, 3 Drawing Sheets

(56) References Cited

U.S. PATENT DOCUMENTS

| | | | |
|---|---|---|---|
| 2002/0094481 A1* | 7/2002 | Goto et al. | 429/218.1 |
| 2003/0027048 A1* | 2/2003 | Lu et al. | 429/231.1 |
| 2003/0108790 A1 | 6/2003 | Manthiram et al. | |
| 2003/0207177 A1* | 11/2003 | Matsubara | H01M 4/366 |
| | | | 429/231.8 |
| 2008/0070122 A1* | 3/2008 | Park et al. | 429/330 |
| 2008/0085452 A1* | 4/2008 | Park | 429/220 |
| 2011/0076556 A1 | 3/2011 | Karthikeyan et al. | |
| 2011/0168938 A1* | 7/2011 | Esaki | H01M 4/13 |
| | | | 252/62.55 |
| 2011/0274974 A1* | 11/2011 | Sabi et al. | 429/220 |

FOREIGN PATENT DOCUMENTS

| | | |
|---|---|---|
| CN | 101150189 A | 3/2008 |
| CN | 101159327 A | 4/2008 |
| CN | 101369657 A | 2/2009 |
| CN | 101449418 A | 6/2009 |
| CN | 101853965 A | 10/2010 |
| EP | 0 997 956 A1 | 5/2000 |
| JP | 11-185758 | 7/1999 |
| JP | 2000-149948 | 5/2000 |
| JP | 2008016446 A | 1/2008 |
| JP | 2008053207 A | 3/2008 |
| KR | 10-2002-0024520 | 3/2002 |
| KR | 10-0420050 | 2/2004 |
| KR | 10-0883752 | 2/2009 |
| KR | 1020100118809 A | 11/2010 |
| WO | WO 2010090125 A1 * | 8/2010 |
| WO | 2011031544 A2 | 3/2011 |

OTHER PUBLICATIONS

European Search Report for Application No. 12166188.8-1227 dated Aug. 16, 2012.

Fey, et al., MgAl2O4 spinel-coated LiCoO2 as long-cycling cathode materials, Journal of Power Sources vol. 146 Aug. 26, 2005 pp. 245-249.

English abstract of KR 10-2008-0010169 (Jan. 2008).

English abstract of KR 10-2003-0032718 (Apr. 2003).

Korean Office Action with English Translation for Application No. 10-2011-0042623 dated Nov. 19, 2012.

Office Action for CN Publication No. 102769128 A (Application No. 201210135976.0), Filing Date May 4, 2012; Office Action dated Feb. 29, 2016; 12 pages (English Translation Provided).

Fey, et al., MgAl2O4 spinel-coated LiCoO2 as long-cycling cathode materials, Science Direct, Journal of Power Sources 146 (2005), pp. 245-249.

Japanese Office Action with English Translation for Application No. 2012-105881 dated Dec. 14, 2015.

CN Office Action dated Jun. 23, 2015; Application No. 201210135976.0; With English Translation.

R.K. Sinha, et al.; Low Temperature Synthesis of Spinel (MgAl2O4); Elsevier, Materials Letters No. 31, pp. 281-285; Jun. 1997.

Sanjay Mathur, et al.; "Single-Source Sol-Gel Synthesis of Nanocrystalline ZnAl2O4: Structural and Optical Properties"; J. Am. Ceram. Soc., vol. 84, No. 9, pp. 1921-1928; 2001.

\* cited by examiner

ELECTRODE ACTIVE MATERIAL, PREPARATION METHOD THEREOF, AND ELECTRODE AND LITHIUM BATTERY CONTAINING THE SAME

CROSS-REFERENCE TO RELATED APPLICATIONS

This application claims the benefit of Korean Patent Application No. 10-2011-0042623, filed on May 4, 2011, in the Korean Intellectual Property Office, the disclosure of which is incorporated herein in its entirety by reference.

BACKGROUND

1. Field

Aspects of the present invention relate to an electrode active material, a preparation method thereof, and an electrode and a lithium battery including the same.

2. Description of the Related Art

For smaller and higher performance devices, it is important to increase the energy density of a lithium battery, in addition to decreasing the size and weight thereof. That is, a high-voltage and high-capacity lithium battery becomes important.

For realizing a lithium battery satisfying the above-stated requirements, research is being conducted on cathode active materials with high voltage and high capacity.

When typical cathode active materials with high voltage and high capacity are used, side reactions, such as elution of transition metals and generation of gas, occur at a high temperature and/or a voltage higher than about 4.4 V. Due to the side reactions, the performance of the battery is degraded.

Therefore, methods for preventing degradation of a battery in a high temperature and a high voltage environment are required.

SUMMARY

Aspects of the present invention provide electrode active materials capable of preventing degradation of performance of a battery under conditions of high temperatures and high voltages.

Aspects of the present invention provide electrodes including the electrode active materials.

Aspects of the present invention provide lithium batteries adopting the electrodes.

Aspects of the present invention provide methods of manufacturing the electrode active materials.

According to an aspect of the present invention, an electrode active material includes a core capable of occluding and emitting lithium; and a surface treatment layer formed on at least a portion of a surface of the core, wherein the surface treatment layer includes a lithium-free oxide having a spinel structure.

According to another aspect of the present invention, an electrode includes the electrode active material.

According to still another aspect of the present invention, a lithium battery includes the electrode.

According to still another aspect of the present invention, a method of manufacturing an electrode active material includes preparing a resulting material obtained by making a core including a cathode active material or an anode active material in contact with a spinel-structured lithium-free oxide or a precursor thereof; and selectively firing the resulting material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
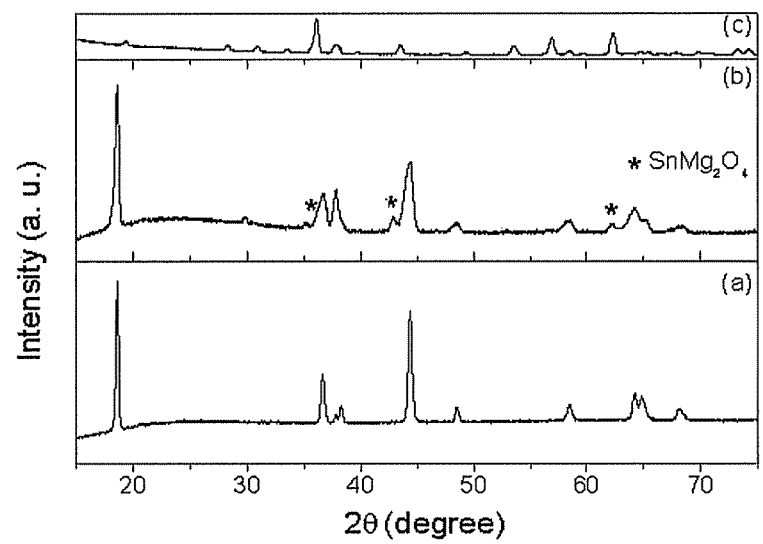
FIG. 1 illustrates results of an X-ray diffraction (XRD) experiment on the cathode active material manufactured according to: Comparative Example 1; Example 19; and independently synthesized $SnMg_2O_4$.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, an electrode material, a manufacturing method thereof, and an electrode and a battery including the same, according to exemplary embodiments, will be described.

An electrode material according to an embodiment includes a core capable of occluding and emitting lithium; and a surface treatment layer formed on at least a portion of the core, wherein the surface treatment layer includes a lithium-free oxide having a spinel structure.

The spinel-structured lithium-free oxide does not occlude and emit lithium, and thus, is not involved in a battery capacity. Therefore, the surface treatment layer including the oxide may serve, for example, as a protective layer of the core. That is, the surface treatment layer may serve to suppress a side reaction between the core and an electrolyte. The surface treatment layer may also serve to prevent transition metals from erupting from the core capable of occluding and emitting lithium.

Any spinel-structured oxide including elements of two or more metals, except for lithium, or elements of a metalloid may be used as the spinel-structured lithium-free oxide.

The spinel-structured lithium-free oxide has a stronger metal-oxygen bond in comparison with an oxide having a typical halite crystal structure, for example, NaCl, CaO, and FeO; or an oxide having a corundum crystal structure, for example, $Al_2O_3$, $Fe_2O_3$, $FeTiO_3$, and MgO. Therefore, a stable surface treatment layer may be formed under high temperature and high voltage conditions.

For example, the lithium-free oxide may be expressed as the following Chemical formula 1:

$$AB_2O_4, \qquad \text{<Chemical formula 1>}$$

where A is one or more elements selected from the group consisting of tin (Sn), magnesium (Mg), molybdenum (Mo), copper (Cu), zinc (Zn), titanium (Ti), nickel (Ni), calcium (Ca), iron (Fe), vanadium (V), lead (Pb), cobalt (Co), germanium (Ge), cadmium (Cd), mercury (Hg), strontium (Sr), manganese (Mn), aluminum (Al), tungsten (W), and beryllium (Be); B is one or more elements selected from the group consisting of Mg, Zn, Al, V, Mn, gallium (Ga), chromium (Cr), Fe, rhodium (Rh), Ni, indium (In), Co, and Mn; and A is different from B.

For example, the lithium-free oxide may be one or more oxides selected from the group consisting of $SnMg_2O_4$, $SnZn_2O_4$, $MgAl_2O_4$, $MoAl_2O_4$, $CuAl_2O_4$, $ZnAl_2O_4$, $ZnV_2O_4$, $TiMn_2O_4$, $ZnMn_2O_4$, $NiAl_2O_4$, $MgGa_2O_4$, $ZnGa_2O_4$, $CaGa_2O_4$, $TiMg_2O_4$, $VMg_2O_4$, $MgV_2O_4$, $FeV_2O_4$, $ZnV_2O_4$, $MgCr_2O_4$, $MnCr_2O_4$, $FeCr_2O_4$, $CoCr_2O_4$, $NiCr_2O_4$, $CuCr_2O_4$, $ZnCr_2O_4$, $CdCr_2O_4$, $TiMn_2O_4$, $ZnMn_2O_4$, $MgFe_2O_4$, $TiFe_2O_4$, $MnFe_2O_4$, $CoFe_2O_4$, $NiFe_2O_4$, $CuFe_2O_4$, $ZnFe_2O_4$, $CdFe_2O_4$, $AlFe_2O_4$, $PbFe_2O_4$, $MgCo_2O_4$, $TiCo_2O_4$, $ZnCo_2O_4$, $SnCo_2O_4$, $FeNi_2O_4$, $GeNi_2O_4$, $MgRh_2O_4$, $ZnRh_2O_4$, $TiZn_2O_4$, $SrAl_2O_4$, $CrAl_2O_4$, $MoAl_2O_4$, $FeAl_2O_4$, $CoAl_2O_4$, $MgGa_2O_4$, $ZnGa_2O_4$, $MgIn_2O_4$, $CaIn_2O_4$, $FeIn_2O_4$, $CoIn_2O_4$, $NiIn_2O_4$, $CdIn_2O_4$, and $HgIn_2O_4$.

On an X-ray diffraction spectrum of the lithium-free oxide, a ratio of the peak intensity of a (111) crystal face to the peak intensity of a (311) crystal face, i.e., I(111)/I(311), may be about 0.3 or more. For example, the I(111)/I(311) may range from about 0.3 to about 0.9.

Also, on an X-ray diffraction spectrum of the lithium-free oxide, a ratio of the peak intensity of a (111) crystal face to the peak intensity of a (400) crystal face, i.e., I(111)/I(400), may be about 0.6 or more. For example, the I(111)/I(400) may range from about 0.6 to about 1.5.

The lithium-free oxide content may be less than about 10 wt %, for example, may be less than about 5 wt % on a basis of a total weight of electrode active material. For example, the lithium-free oxide content may be larger than 0 and less than about 10 wt %. For example, the lithium-free oxide content may be larger than 0 and less than about 5 wt %.

The surface treatment layer of the electrode active material may include two or more elements selected from the group consisting of a metal and a metalloid with an atomic weight of 9 or more, and the elements may be selected from the group consisting of Sn, Mg, Mo, Cu, Zn, Ti, Ni, Ca, Al, V, Mn, Ga, Fe, Cr, Rh, In, Pb, Co, Ge, Cd, Hg, Sr, W and Be.

Contents of the two or more elements included in the surface treatment layer and selected from the group consisting of a metal and a metalloid with an atomic weight of 9 or more may be less than about 10 wt %, for example, may be less than about 5 wt % on a basis of the total weight of electrode active material.

The composition ratio of the two or more elements of the surface treatment layer selected from the group consisting of a metal and a metalloid with an atomic weight of 9 or more may be about 4:2.1 to about 4:3.9. For example, the composition ratio may be about 4:2.5 to about 4:3.5. For example, the composition ratio may be about 4:2.9 to about 4:3.1. For example, the composition ratio may be about 4:3. The composition ratio corresponds to a composition ratio of oxygen to A+B in lithium-free oxide included in the surface treatment layer and having a composition formula of $AB_2O_4$.

The thickness of the surface treatment layer of the electrode active material may range from about 1 Å to about 1 μm. For example, the thickness of the surface treatment layer may range from about 1 nm to about 1 μm. For example, the thickness of the surface treatment layer may range from about 1 nm to about 100 nm. For example, the thickness of the surface treatment layer may range from about 1 nm to about 30 nm.

The average particle diameter of the core of the electrode active material may range from about 10 nm to about 50 μm. For example, the average particle diameter of the core may range from about 10 nm to about 30 μm. For example, the average particle diameter of the core may range from about 1 μm to about 30 μm.

The core capable of occluding and emitting lithium in the electrode active material may include a cathode active material. The cathode active material may be a lithium transition metal oxide. Any lithium transition metal oxide for a cathode of a lithium battery that is used in the art may be used as the lithium transition metal oxide. For example, the lithium transition metal oxide may have a spinel structure or a layered structure.

The lithium transition metal oxide may be a single composition, compound or a composite of two or more compounds. For example, the lithium transition metal oxide may be a composite of two or more compounds having layered-structures. For example, the lithium transition metal oxide may be a composite of a compound having a layered-structure and a compound having a spinel-structure.

The lithium transition metal oxide may include over-lithiated oxide (OLO) or lithium transition metal oxide with the average operating voltage about 4.3 V or higher. For example, the average operating voltage of the lithium transition metal oxide may range from about 4.3 V to about 5.0 V.

The average operating voltage mean is a value obtained by dividing a charge/discharge electric energy by a charge/discharge quantity of electricity when the battery is charged and discharged to an upper limit and a lower limit of a charge/discharge voltage at a recommended operating voltage of the battery.

The core may include, for example, compounds expressed as the following Chemical formulas 2 and 3:

$$Li[Li_aMe_{1-a}]O_{2+d} \qquad \text{<Chemical formula 2>}$$

$$Li[Li_bMe_cM'_e]O_{2+d}, \qquad \text{<Chemical formula 3>}$$

where 0<a<1, b+c+e=1; 0<b<1, 0<e<0.1; 0≤d≤0.1; Me is one or more metals selected from the group consisting of Ti, V, Cr, Mn, Fe, Co, Ni, Cu, Al, Mg, Zr, and B; and M' is one or more metals selected from the group consisting of Mo, W, Ir, Ni, and Mg. For example, in chemical formula 1, two or more metals of Me can have various composition ratios as long as sum of them satisfies 1-a.

Also, the core may include compounds expressed as the following Chemical formulae 4 to 8:

$$Li_xCo_{1-y}M_yO_{2-\alpha}X_\alpha \qquad \text{<Chemical formula 4>}$$

$$Li_xCo_{1-y-z}Ni_yM_zO_{2-\alpha}X_\alpha \qquad \text{<Chemical formula 5>}$$

$$Li_xMn_{2-y}M_yO_{4-\alpha}X_\alpha \qquad \text{<Chemical formula 6>}$$

$$Li_xCo_{2-y}M_yO_{4-\alpha}X_\alpha \qquad \text{<Chemical formula 7>}$$

$$Li_xMe_yM_zPO_{4-\alpha}X_\alpha, \qquad \text{<Chemical formula 8>}$$

where 0.90≤x≤1.1, 0≤y≤0.9, 0≤z≤0.5, 1−y−z>0, 0≤α≤2; Me is one or more metals selected from the group consisting of Ti, V, Cr, Mn, Fe, Co, Ni, Cu, Al, Mg, Zr, and B; M is one or more elements selected from the group consisting of Mg, Ca, Sr, Ba, Ti, Zr, Nb, Mo, W, Zn, Al, Si, Ni, Mn, Cr, Fe, Mg, Sr, V, and rare-earth elements; and X is an element selected from the group consisting of O, F, S, and P.

Also, the core may include compounds expressed as the following Chemical formulas 9 and 10:

$pLi_2MO_3$-$(1-p)LiMeO_2$ <Chemical formula 9>

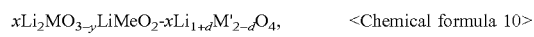
$xLi_2MO_{3-y}LiMeO_2$-$xLi_{1+d}M'_{2-d}O_4$, <Chemical formula 10> where $0<p<1$, $x+y+z=1$; $0<x<1$, $0<y<1$, $0<z<1$; $0 \leq d \leq 0.33$; M is one or more elements selected from the group consisting of Mg, Ca, Sr, Ba, Ti, Zr, Nb, Mo, W, Zn, Al, Si, Ni, Mn, Cr, Fe, Mg, Sr, V, and rare-earth elements; Me is one or more metals selected from the group consisting of Ti, V, Cr, Mn, Fe, Co, Ni, Cu, Al, Mg, Zr, and B; and M' is one or more metals selected from the group consisting of Ti, V, Cr, Mn, Fe, Co, Ni, Cu, Al, Mg, Zr, and B.

The compound of Chemical formula 9 may have a layered-structure, and $Li_2MO_3$—$LiMeO_2$ and $Li_{1+d}M'_{2-d}O_4$ as compounds of Chemical formula 10 may have a layered-structure and a spinel-structure, respectively.

The core capable of charging and discharging lithium in the electrode active material may include an anode active material. The anode active material may include one or more materials selected from the group consisting of a lithium metal, metal which is alloyable with lithium, a transition metal oxide, a non-transition metal oxide, and a carbon material. Any anode active material for a lithium battery which is used in the art may be used as the anode active material.

The metal, which is alloyable with lithium, may be Si, Sn, Al, Ge, Pb, Bi, Sb, Si-T alloy, (T is alkali metal, alkali earth metal, group 13 element, group 14 element, transition metal, rare-earth metal, or a combination thereof, and is not Si), and Sn—Z alloy (Z is alkali metal, alkali earth metal, group 13 element, group 14 element, transition metal, rare-earth metal, or a combination thereof, and is not Sn). The elements T and Z may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be lithium titanium oxide, vanadium oxide, or lithium vanadium oxide.

The non-transition oxide may be $SnO_2$ or $SiO_x$ ($0<x<2$).

The carbon material may be crystalline carbon, amorphous carbon, or a combination thereof. The crystalline carbon may be synthetic graphite or natural graphite of amorphous type, plate type, flake type, spherical type, or fiber type. The amorphous carbon may be soft carbon (low-temperature-fired carbon), hard carbon, mesophase pitch carbide, or fired coke.

The surface treatment layer of the electrode active material may be formed by contacting a spinel-structured lithium-free oxide or a precursor thereof with the core and by optionally firing it. That is, the core capable of occluding and emitting lithium is contacted by the spinel-structured lithium-free oxide or the precursor thereof, and is selectively fired for the surface-treated electrode active material to be manufactured. When the precursor of lithium-free oxide is used, a firing process may be performed. During the firing process, if the firing time is less than about three hours, the spinel-structured lithium-free oxide may not be obtained from the precursor.

An electrode according to another embodiment may include the above-described electrode active material. The electrode may be a cathode or an anode.

The cathode may be manufactured as follows. A cathode active material composition is prepared by mixing a cathode active material having a surface treatment layer formed on at least a portion of a surface thereof, a conducting agent, a binder, and a solvent. The cathode active material composition may be directly coated on an aluminum current collector and dried for manufacturing a cathode plate on which a cathode active layer is formed. Alternatively, the cathode active material composition may be cast on a separate support, and then a film peeled from the support is laminated on the aluminum current collector to manufacture the cathode plate on which the cathode active layer is formed.

As the conducting agent, carbon black, natural graphite, artificial graphite, acetylene black, carbon fiber, metal powder, metal fiber, or a metal tube such as a nanotube, copper, nickel, aluminum, and silver; and a conductive polymer such as polyphenylene derivatives may be used. However, the conducting agent is not limited thereto, and any conducting agent in the art may be used.

As the binder, vinylidene fluoride/hexafluoropropylene co-polymer, polyvinylidene fluoride (PVDF), polyacrylonitrile, poly(methyl methacrylate), polytetrafluoroethylene (PTFE), mixture of the foregoing polymers, and styrene butadiene rubber polymer may be used. As the solvent, N-methylpyrrolidone (NMP), acetone, and water may be used. However, the solvent is not limited thereto, and any solvent in the art may be used. Contents of the cathode active material, the conducting agent, the binder, and the solvent may be typical levels used for a lithium battery.

The anode may be manufactured using the same method as that for the cathode except that an anode active material instead of a cathode active material is used. For example, the anode may be manufactured as follows. An anode active material composition is manufactured by mixing the anode active material having a surface treatment layer formed on at least a portion of a surface thereof, a conducting agent, a binder, and a solvent. The anode active material composition may be directly coated on a copper current collector for manufacturing an anode plate. Alternatively, the anode active material composition may be cast on a separate support, and then an anode active material film peeled from the support is laminated on the copper current collector to manufacture the anode plate.

The same conducting agent, binder, and solvent as in the cathode may be used for the anode active material. Accordingly, a plasticizer may be added to the cathode active material composition and the anode active material composition to form pores in the electrode plate.

Contents of the anode active material, the conducting agent, the binder, and the solvent may be typical levels used for a lithium battery. According to use and structure of a lithium battery, one or more of the conducting agent, the binder, and the solvent may be omitted.

An electrode according to another embodiment may include a current collector. An electrode active material layer and a surface treatment layer are formed thereon, wherein the surface treatment layer comprises a lithium-free oxide having a spinel structure. The electrode active material layer may include an electrode active material, a conducting agent, and a binder. Since the surface treatment layer is formed on the electrode's surface, a side reaction of the electrode may be suppressed and transition metal may be prevented from erupting from the electrode.

That is, after the electrode active material layer is formed, the surface treatment layer may be separately formed on the electrode active material layer.

The lithium-free oxide of the electrode may be expressed as the following Chemical formula 1.

$$AB_2O_4, \quad \text{<Chemical formula 1>}$$

where A is one or more elements selected from the group consisting of Sn, Mg, Mo, Cu, Zn, Ti, Ni, Ca, Fe, V, Pb, Co, Ge, Cd, Hg, Sr, Mn, Al, W, and Be; B is one or more elements selected from the group consisting of Mg, Zn, Al, V, Mn, Ga, Cr, Fe, Rh, Ni, In, Co, and Mn; and A is different from B.

For example, the lithium-free oxide may be one or more oxides selected from a group consisting of $SnMg_2O_4$, $SnZn_2O_4$, $MgAl_2O_4$, $MoAl_2O_4$, $CuAl_2O_4$, $ZnAl_2O_4$, $ZnV_2O_4$, $TiMn_2O_4$, $ZnMn_2O_4$, $NiAl_2O_4$, $MgGa_2O_4$, $ZnGa_2O_4$, $CaGa_2O_4$, $TiMg_2O_4$, $VMg_2O_4$, $MgV_2O_4$, $FeV_2O_4$, $ZnV_2O_4$, $MgCr_2O_4$, $MnCr_2O_4$, $FeCr_2O_4$, $CoCr_2O_4$, $NiCr_2O_4$, $CuCr_2O_4$, $ZnCr_2O_4$, $CdCr_2O_4$, $TiMn_2O_4$, $ZnMn_2O_4$, $MgFe_2O_4$, $TiFe_2O_4$, $MnFe_2O_4$, $CoFe_2O_4$, $NiFe_2O_4$, $CuFe_2O_4$, $ZnFe_2O_4$, $CdFe_2O_4$, $AlFe_2O_4$, $PbFe_2O_4$, $MgCo_2O_4$, $TiCo_2O_4$, $ZnCo_2O_4$, $SnCo_2O_4$, $FeNi_2O_4$, $GeNi_2O_4$, $MgRh_2O_4$, $ZnRh_2O_4$, $TiZn_2O_4$, $SrAl_2O_4$, $CrAl_2O_4$, $MoAl_2O_4$, $FeAl_2O_4$, $CoAl_2O_4$, $MgGa_2O_4$, $ZnGa_2O_4$, $MgIn_2O_4$, $CaIn_2O_4$, $FeIn_2O_4$, $CoIn_2O_4$, $NiIn_2O_4$, $CdIn_2O_4$, and $HgIn_2O_4$.

The surface treatment layer of the electrode may be formed by contacting the lithium-free oxide, which has a spinel structure on the surface of the active material layer, or a precursor thereof with the core and by selectively firing it.

A lithium battery according to another embodiment adopts the electrode. The lithium battery, for example, may be manufactured as follows. First, a cathode and an anode according to an embodiment are manufactured as described above. Next, a separator to be inserted between the cathode and the anode is prepared. Any separator typically used for a lithium battery may be used. A separator which has low resistance to ion movement of an electrolyte and has an excellent ability in containing an electrolyte solution may be used. For example, the separator may be glass fiber, polyester, polyethylene, polypropylene, PTFE, or a combination thereof, wherein the selected separator may be a non-woven fiber type or a woven fiber type separator. For example, a windable separator such as polyethylene and polypropylene may be used for a lithium-ion battery, and a separator having an excellent ability in containing an organic electrolyte solution may be used for the lithium-ion polymer battery.

The separator may be manufactured as follows. The separator composition is prepared by mixing a polymer resin, a filler, and a solvent. The separator composition may be directly coated on the electrode and dried for forming the separator. Or, the separator composition may be cast on a support and dried, and then a separator film peeled from the support may be laminated on the electrode for forming the separator.

The polymer resin used for manufacturing the separator is not particularly limited, and thus, any material used as a bonding material of an electrode plate may be used. For example, vinylidene fluoride/hexafluoropropylene co-polymer, PVDF, polyacrylonitrile, poly(methyl methacrylate), or a combination thereof may be used.

Next, an electrolyte is prepared. For example, the electrolyte may be an organic electrolyte solution. The electrolyte may be a solid. For example, the electrolyte may be boron oxide or lithium oxynitride; however, it is not limited thereto, and any solid electrolyte used in the art may be used. The solid electrolyte may be formed on the anode using a sputtering method.

For example, an organic electrolyte solution may be prepared. The organic electrolyte solution may be manufactured by dissolving a lithium salt in an organic solvent. Any organic solvent used in the art may be used for the organic solvent. For example, propylene carbonate, ethylene carbonate, fluoroethylene carbonate, butylene carbonate, dimethyl carbonate, diethyl carbonate, ethyl methyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a combination thereof may be used.

Any lithium salt used in the art may be used for the lithium salt. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are natural numbers), LiCl, LiI, or a combination thereof may be used.

Figure 5:
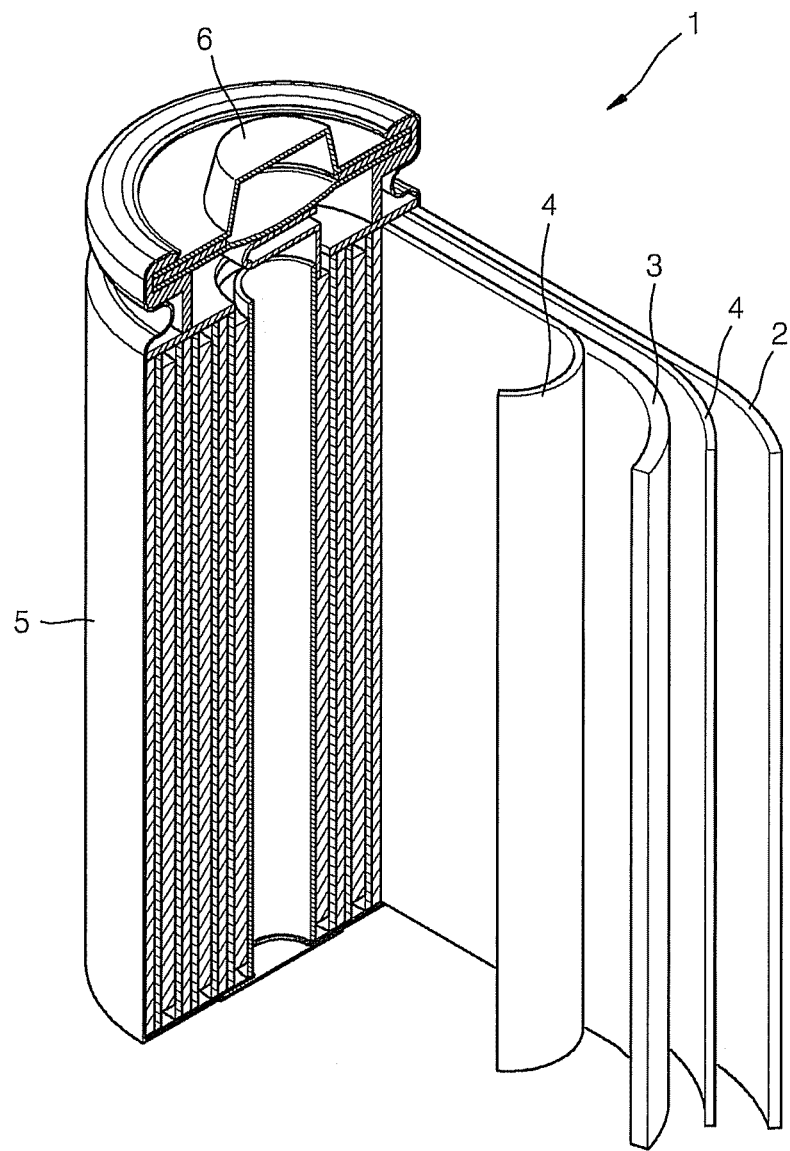
FIG. 5 is a schematic diagram illustrating the lithium battery according to an embodiment.

As illustrated in FIG. 5, a lithium battery 1 includes a cathode 3, an anode 2, and a separator 4. The cathode 3, anode 2, and separator 4, as descried above, are wound or folded to be encased in a battery case 5. Thereafter, an organic electrolyte solution is injected into the battery case 5 and sealed by a cap assembly 6 for completing the lithium battery 1. The battery case 5 may have a cylindrical shape, a square shape, or a thin film shape. For example, the battery 1 may be a large thin film type battery. The battery 1 may be a lithium-ion battery.

The separator 4 may be disposed between the cathode 3 and the anode 2 to form a battery structure. The battery structure is layered as a bicell structure and is placed in an organic electrolyte solution, and then the obtained structure is accommodated in a pouch and is sealed to complete the lithium-ion polymer battery.

A plurality of the battery structures may be layered for forming a battery pack, and the battery pack may be used for any high-capacity and high-output devices. For example, the battery pack may be used for a notebook computer, a smartphone, or an electric vehicle.

Since the lithium battery has excellent storage stability, life characteristics, and high rate characteristics under a high temperature, the lithium battery may be used in an electric vehicle (EV). For example, the lithium battery may be used in a hybrid vehicle such as a plug-in hybrid electric vehicle (PHEV).

A method of manufacturing the electrode active material, according to another embodiment, may include preparing a resulting material obtained by contacting a core capable of occluding and emitting lithium with a spinel-structured lithium-free oxide or a precursor thereof; and selectively firing the resulting material. The resulting material may be a precipitate or a mixture. The firing process may be performed when the precursor of a lithium-free oxide is used, and may be omitted when a lithium-free oxide is used.

The precursor may include a salt of two or more elements selected from the group consisting of a metal and a metalloid with an atomic weight of 9 or more. For example, the salt may be an acetate salt, a chloride salt, a nitrate salt, an oxalate salt, an isopropoxide and a combination thereof.

According to the foregoing method, the content of the lithium-free oxide or the precursor thereof may be less than about 10 wt % on a basis of the total weight of the core and the lithium-free oxide or a precursor thereof. For example, the content of the lithium-free oxide or the precursor thereof may be less than about 5 wt % on the basis of the total weight of the core and the lithium-free oxide or the precursor thereof. For example, the content may be larger than 0 and less than about 10 wt %. For example, the content may be larger than 0 and less than about 5 wt %.

According to the foregoing method, the contact process may be performed in air or in a solution. That is, the contact process may be a dry coating process or a wet coating process. For the wet coating process, methods such as coprecipitation and dipping, which are known in the art, may be used. For the dry coating process, methods such as milling and granulation, which are known in the art, may be used.

In these embodiments, air is not limited and may be any kind of gas such as oxygen, nitrogen, argon, and the like. For example, the electrode active material may be manufactured by mixing the core and the lithium-free oxide or the precursor thereof in powder form in air or in a nitrogen atmosphere using a ball mill, and then by selectively firing the mixture. The term 'selectively' means that the firing process may be omitted. For example, the electrode active material may be manufactured by mixing the core and the lithium-free oxide or the precursor thereof in a solution, and then drying and selectively firing the mixture. The solvent of the solution may be an organic solvent or water; however, the solvent is not particularly limited thereto.

For example, the electrode active material may be manufactured by placing the core in a solution that includes the precursor of the oxide, and then by removing and firing the core.

For example, the electrode active material may be manufactured by coprecipitating the core and the precursor of the oxide in a solution including them, and then by removing and firing the coprecipitated material.

For example, the electrode active material may be manufactured by mixing the core and the precursor of the oxide in a slurry state, and then drying and firing the mixture.

According to the foregoing method, the firing process may be performed at a temperature ranging from about 500° C. to about 1000° C. For example, the firing process may be performed at a temperature ranging from about 700° C. to about 950° C.

According to the foregoing method, the firing process may be performed for about three to about twenty-four hours. For example, the firing process may be performed for about six to about twenty-four hours. For example, the firing process may be performed for about six to about twelve hours. If the firing time is less than about one hour, the lithium-free oxide included in the surface treatment layer may not have a spinel structure.

According to the foregoing method, the firing process may be performed in an oxygen, air, or nitrogen atmosphere. For example, the firing process may be performed in an air atmosphere.

Aspects of the present disclosure will be described in detail through embodiments and comparative examples. Herein, the embodiments are just for exemplification of the present disclosure, and the present disclosure is not limited thereto.

Manufacturing Surface-Treated OLO Cathode Active Material

Example 1

Tin chloride ($SnCl_2$) and magnesium nitrate ($Mg(NO_3)_2$) were mixed at a composition ratio of about 1:2, and then water was added to the mixture to manufacture a lithium-free oxide precursor slurry. $Li_{1.1}Ni_{0.35}Mn_{0.41}Co_{0.14}O_2$, having an average particle diameter of about 15 μm, was added to and mixed with the lithium-free oxide precursor slurry. The mixture was fired at a temperature of about 850° C. in an oxygen atmosphere for about twelve hours to manufacture a cathode active material including an $Li_{1.1}Ni_{0.35}Mn_{0.41}Co_{0.14}O_2$ core and a surface treatment layer, including $SnMg_2O_4$ formed on the core's surface.

Content of the lithium-free oxide precursor was about 3 wt % on a basis of the total weight of the lithium-free oxide precursor and $Li_{1.1}Ni_{0.35}Mn_{0.41}Co_{0.14}O_2$.

Example 2

A cathode active material was manufactured using the same method as in Example 1 except that $SnCl_2$ and zinc acetate ($Zn(O_2CCH_3)_2$) were used as the lithium-free oxide precursor for forming the surface treatment layer including $SnZn_2O_4$.

Example 3

A cathode active material was manufactured using the same method as in Example 1 except that $Mg(NO_3)_2$ and aluminum nitrate ($Al(NO_3)_3$) were used as the lithium-free oxide precursor for forming the surface treatment layer including $MgAl_2O_4$.

Example 4

A cathode active material was manufactured using the same method as in Example 1 except that copper chloride (CuCl) and $Al(NO_3)_3$ were used as the lithium-free oxide precursor for forming the surface treatment layer including $CuAl_2O_4$.

Example 5

A cathode active material was manufactured using the same method as in Example 1 except that $Zn(O_2CCH_3)_2$ and $Al(NO_3)_3$ were used as the lithium-free oxide precursor for forming the surface treatment layer including $ZnAl_2O_4$.

Example 6

A cathode active material was manufactured using the same method as in Example 1 except that nickel acetate ($Ni(O_2CCH_3)_2$) and $Al(NO_3)_3$ were used as the lithium-free oxide precursor for forming the surface treatment layer including $NiAl_2O_4$.

Examples 7-12

Cathode active materials having surface treatment layers were respectively manufactured using the same methods as in Examples 1 to 6 except that the lithium-free oxide precursor content was changed to about 1 wt %.

Examples 13-18

Cathode active materials having surface treatment layers were respectively manufactured using the same methods as in Examples 1 to 6 except that the lithium-free oxide precursor content was changed to about 5 wt %.

Examples 19-24

Cathode active materials having surface treatment layers were respectively manufactured using the same methods as in Example 1 except that the lithium-free oxide precursor content was changed to about 10 wt %.

Example 25 (Coprecipitation Method)

$SnCl_2$ and $Mg(NO_3)_2$ with a composition ratio of about 1:2 were added to water to prepare a first aqueous solution. $Li_{1.1}Ni_{0.35}Mn_{0.41}Co_{0.14}O_2$ having an average particle diameter of about 15 μm and LiOH were added to water to prepare a second aqueous solution. The first and second aqueous solutions were mixed for coprecipitating $Li_{1.1}Ni_{0.35}Mn_{0.41}Co_{0.14}O_2$ and a precursor of a lithium-free oxide and for obtaining a precipitate. The precipitate was fired at a temperature of about 850° C. in an oxygen atmosphere for about twelve hours to manufacture the cathode active material including the $Li_{1.1}Ni_{0.35}Mn_{0.41}Co_{0.14}O_2$ core and the surface treatment layer including $SnMg_2O_4$ formed on the core's surface.

The content of the lithium-free oxide precursor was about 3 wt % on a basis of the total weight of the lithium-free oxide precursor and $Li_{1.1}Ni_{0.35}Mn_{0.41}Co_{0.14}O_2$.

Comparative Example 1

$Li_{1.1}Ni_{0.35}Mn_{0.41}Co_{0.14}O_2$ having an average particle diameter of about 15 μm was directly used as the cathode active material without manufacturing the surface treatment layer.

Comparative Example 2

The cathode active material was manufactured using the same method as in Example 1 except that the surface treatment layer including $Al_2O_3$ was formed using only $Al(NO_3)_3$.

The content of the lithium-free oxide precursor was about 3 wt % on the basis of the total weight of the lithium-free oxide precursor and $Li_{1.1}Ni_{0.35}Mn_{0.41}Co_{0.14}O_2$.

Comparative Example 3

The cathode active material was manufactured using the same method as in Example 1 except that the surface treatment layer including MgO was formed using only $Mg(NO_3)_2$.

The content of the lithium-free oxide precursor was about 3 wt % on a basis of a total weight of the lithium-free oxide precursor and $Li_{1.1}Ni_{0.35}Mn_{0.41}Co_{0.14}O_2$.

Comparative Example 4

The cathode active material was manufactured using the same method as in Example 3 except that the firing time was shortened to about fifteen minutes.

Manufacturing Surface-Treated 5 V Cathode Active Material

Example 26

$SnCl_2$ and $Mg(NO_3)_2$ were mixed at a ratio of about 1:2, and then water was added to the mixture to manufacture a lithium-free oxide precursor slurry. $LiNi_{0.5}Mn_{1.5}O_4$ having an average particle diameter of about 15 μm was added to and mixed with the lithium-free oxide precursor slurry. The mixture was fired at a temperature of about 850° C. in an oxygen atmosphere for about twelve hours to manufacture a cathode active material including a $LiNi_{0.5}Mn_{1.5}O_4$ core and a surface treatment layer including $SnMg_2O_4$ formed on the core's surface.

The content of the lithium-free oxide precursor was about 3 wt % on the basis of the total weight of the lithium-free oxide precursor and $LiNi_{0.5}Mn_{1.5}O_4$.

Example 27

The cathode active material was manufactured using the same method as in Example 26 except that $SnCl_2$ and $Zn(O_2CCH_3)_2$ were used as the lithium-free oxide precursor for forming the surface treatment layer including $SnZn_2O_4$.

Example 28

The cathode active material was manufactured using the same method as in Example 26 except that $Mg(NO_3)_2$ and $Al(NO_3)_3$ were used as the lithium-free oxide precursor for forming the surface treatment layer including $MgAl_2O_4$.

Example 29

The cathode active material was manufactured using the same method as in Example 26 except that CuCl and $Al(NO_3)_3$ were used as the lithium-free oxide precursor for forming the surface treatment layer including $CuAl_2O_4$.

Example 30

The cathode active material was manufactured using the same method as in Example 26 except that $Zn(O_2CCH_3)_2$ and $Al(NO_3)_3$ were used as the lithium-free oxide precursor for forming the surface treatment layer including $ZnAl_2O_4$.

Example 31

The cathode active material was manufactured using the same method as in Example 26 except that $Ni(O_2CCH_3)_2$ and $Al(NO_3)_3$ were used as the lithium-free oxide precursor for forming the surface treatment layer including $NiAl_2O_4$.

Examples 32-37

The cathode active materials having the surface treatment layers were respectively manufactured using the same methods as in Examples 26 to 31 except that the lithium-free oxide precursor content was changed to about 1 wt %.

Examples 38-43

The cathode active materials having the surface treatment layers were respectively manufactured using the same methods as in Examples 26 to 31 except that the lithium-free oxide precursor content was changed to about 5 wt %.

Examples 44-49

The cathode active materials having the surface treatment layers were respectively manufactured using the same methods as in Examples 26 to 31 except that the lithium-free oxide precursor content was changed to about 10 wt %.

Example 50 (Coprecipitation Method)

$SnCl_2$ and $Mg(NO_3)_2$ with a composition ratio of about 1:2 were added to water to prepare a first aqueous solution.

$LiNi_{0.5}Mn_{1.5}O_4$ having an average particle diameter of about 15 μm and LiOH were added to water to prepare a second aqueous solution. The first and second aqueous solutions were mixed for coprecipitating $LiNi_{0.5}Mn_{1.5}O_4$ and a precursor of a lithium-free oxide and for obtaining a precipitate. The precipitate was fired at a temperature of about 850° C. in an oxygen atmosphere for about twelve hours to manufacture $LiNi_{0.5}Mn_{1.5}O_4$ on the surface of which a surface treatment layer including $SnMg_2O_4$ is formed.

The content of the lithium-free oxide precursor was about 3 wt % on a basis of a total weight of the lithium-free oxide precursor and $LiNi_{0.5}Mn_{1.5}O_4$.

Comparative Example 5

$LiNi_{0.5}Mn_{1.5}O_4$ having an average particle diameter of about 15 μm was directly used as the cathode active material without manufacturing a surface treatment layer.

Comparative Example 6

The cathode active material was manufactured using the same method as in Example 26 except that a surface treatment layer including $Al_2O_3$ is formed using only $Al(NO_3)_3$.

The content of the lithium-free oxide precursor was about 3 wt % on the basis of the total weight of the lithium-free oxide precursor and $LiNi_{0.5}Mn_{1.5}O_4$.

Comparative Example 7

The cathode active material was manufactured using the same method as in Example 26 except that the surface treatment layer including MgO is formed using only $Mg(NO_3)_2$.

The content of the lithium-free oxide precursor was about 3 wt % on the basis of the total weight of the lithium-free oxide precursor and $LiNi_{0.5}Mn_{1.5}O_4$.

Manufacturing Cathode

Example 51

The cathode active material manufactured according to Example 1, a carbon conducting agent (SUPER P® Li) (Timcal Corp.), and PVDF were mixed at a weight ratio of about 90:4:6, and then the mixture was mixed with NMP in an agate mortar to manufacture a slurry. The slurry was applied on an aluminum current collector to a thickness of about 20 μm using a doctor blade, was dried at room temperature, and then was dried again under a vacuum condition at a temperature of about 120° C. and was rolled to form a cathode plate on which the cathode active material layer is formed.

Examples 52-100

Cathode plates were manufactured using the same method as in Example 51 except that the cathode active materials of Examples 2 to 50 were respectively used.

Example 51-1 (Forming Surface Treatment Layer on Electrode Surface)

$Li_{1.1}Ni_{0.35}Mn_{0.41}Co_{0.14}O_2$, having an average particle diameter of about 15 μm, SUPER P Li, and PVDF were mixed at a weight ratio of about 90:4:6, and then the mixture was mixed with NMP in an agate mortar to manufacture a slurry. The slurry was applied on an aluminum current collector to a thickness of about 20 μm using a doctor blade, was dried at room temperature, and then was dried again under a vacuum condition at a temperature of about 120° C. and was rolled to form a cathode plate on which the cathode active material layer was formed.

The cathode plate was placed in lithium-free oxide precursor slurry for about six hours. The slurry was manufactured by mixing $SnCl_2$ and $Mg(NO_3)_2$ with a composition ratio of about 1:2 and then by adding water to the mixture, and was taken out and fired at a temperature of about 850° C. for about twelve hours to manufacture the electrode on a surface of which the surface treatment layer including $SnMg_2O_4$ was formed.

Comparative Examples 8-14

Cathode plates were manufactured using the same method as in Example 51 except that the cathode active materials of Comparative Examples 1 to 7 were used.

Manufacturing Lithium Battery

Example 101

A coin cell was manufactured using the cathode plate manufactured according to Example 51, lithium metal as a counter electrode, and a solution, in which a PTFE separator and 1.0M $LiPF_6$ are dissolved by ethylene carbonate (EC)+ dimethylene carbonate (DMC) (volume ratio of about 1:1), as the electrolyte.

Examples 102-150

Coin cells were manufactured using the same methods as in Example 101 except that cathode plates manufactured according to Examples 52 to 100 were respectively used.

Comparative Examples 15-21

Coin cells were manufactured using the same methods as in Example 101 except that cathode plates manufactured according to Comparative Examples 8 to 14 were respectively used.

Evaluation Example 1: XRD Experiment (1)

An X-ray diffraction (XRD) experiment was performed on each surface of the cathode active materials manufactured according to Example 19 and the Comparative Example 1 and separately synthesized $SnMg_2O_4$. The results thereof are illustrated in FIG. 1. FIG. 1 (b) illustrates the result of an XRD experiment on the cathode active material manufactured according to Example 19. FIG. 1 (c) illustrates the result of an XRD experiment on $SnMg_2O_4$, independently synthesized by firing a lithium-free oxide precursor slurry with water, at a temperature of about 850° C. in an oxygen atmosphere for about twelve hours, which was manufactured by mixing $SnCl_2$ and $Mg(NO_3)_2$ at a composition ratio of about 1:2. FIG. 1 (a) illustrates the result of an XRD experiment on the cathode active material manufactured according to Comparative Example 1. This is a reference material.

As illustrated in FIG. 1 (b), a characteristic peak corresponding to FIG. 1(c) of an $SnMg_2O_4$ spinel crystal structure formed on the surface of the cathode active material of Example 19 was shown. In other words, FIG. 1(b) shows peaks from SnMg$_2$O$_4$ and peaks from the cathode active material core simultaneously; however, as illustrated in FIG. 1 (a), this peak from SnMg$_2$O$_4$ was not shown from Comparative Example 1.

Evaluation Example 2: XRD Experiment (2)

Lithium-free spinel oxides expected to be formed on the surface of cathode active materials manufactured according to Example 3 and Comparative Example 4 were separately synthesized, and an XRD experiment was performed on the lithium-free spinel oxides. The results are illustrated in FIG. 2.

Figure 2:
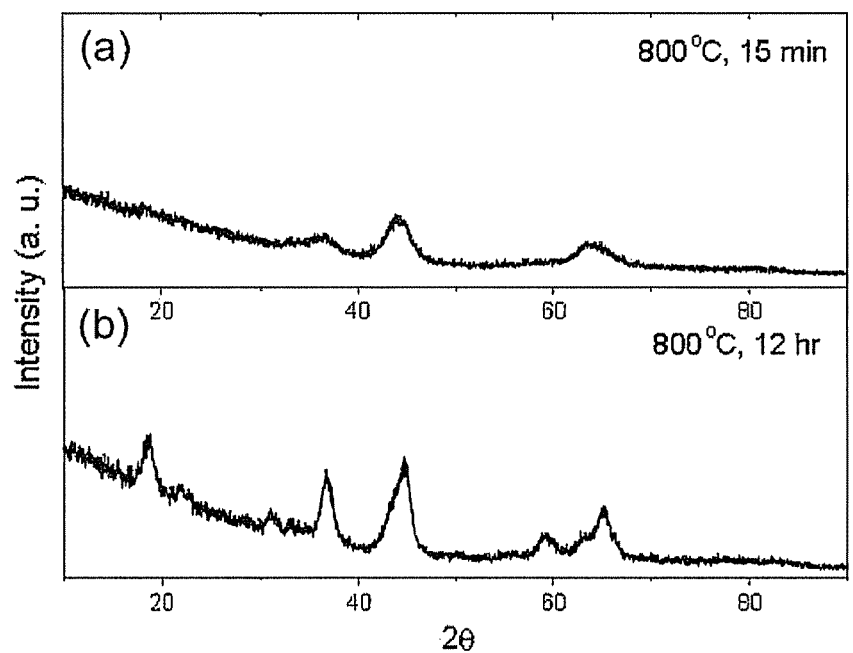
FIG. 2 illustrates results of an XRD experiment on: $MgAl_2O_4$ synthesized by performing a firing process for about 15 minutes; and $MgAl_2O_4$ synthesized by performing a firing process for about 12 hours.

FIG. 2 (a) illustrates the result of an XRD experiment on MgAl$_2$O$_4$ separately synthesized by firing the lithium-free oxide precursor slurry with water, at a temperature of about 800° C. in an oxygen atmosphere for about fifteen minutes, which was manufactured by mixing Mg(NO$_3$)$_2$ and Al(NO$_3$)$_3$ at a composition ratio of about 1:2.

FIG. 2 (b) illustrates the result of an XRD experiment on MgAl$_2$O$_4$ separately synthesized by firing lithium-free oxide precursor slurry with water, at a temperature of about 800° C. in an oxygen atmosphere for about twelve hours, which was manufactured by mixing Mg(NO$_3$)$_2$ and Al(NO$_3$)$_3$ at a composition ratio of about 1:2.

A characteristic peak corresponding to an MgAl$_2$O$_4$ spinel crystal structure is shown in FIG. 2 (b); however, a characteristic peak corresponding to an MgAl$_2$O$_4$ spinel crystal structure is not shown in FIG. 2 (a). That is, it is confirmed that MgAl$_2$O$_4$ spinel-structured crystal may be synthesized when a firing process is performed at a temperature of about 800° C. for more than about three hours. Therefore, it is determined that a surface treatment layer including MgAl$_2$O$_4$ crystal was not formed in Comparative Example 4.

Evaluation Example 3: Ion-Coupled Plasma (ICP) Experiment

An ICP experiment was performed on the surface of the cathode active material manufactured according to Example 1.

The device for the ICP experiment was the model ICPS-8100 of Shimadzu Corporation. The composition ratio of Sn:Mg:O on the cathode active material surface was about 0.97:2.02:3.97.

Evaluation Example 4: Transmission Electron Microscope (TEM) Experiment

Figure 3:
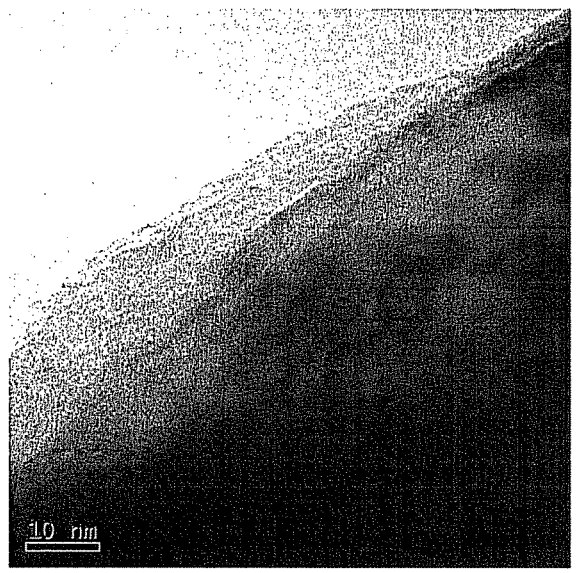
FIG. 3 illustrates a transmission electron microscope (TEM) image of the cathode active material manufactured according to an embodiment.

A TEM image of the surface of the cathode active material manufactured according to Example 1 was captured. The result is illustrated in FIG. 3. As illustrated in FIG. 3, the surface treatment layer was formed on the surface of the active material core The thickness of the surface treatment layer was about 8 nm to about 12 nm.

Evaluation Example 5: Stability Experiment at a High Temperature of about 90° C.

In the first cycle coin cells, manufactured according to Examples 101 to 106 and Comparative Examples 15 to 17, were subjected to a constant-current charge until the voltage was at about 4.45 V at a rate of about 0.05 C, and were subjected to a constant-current discharge until the voltage was at about 3.0 V at a rate of about 0.05 C. In the second cycle, the coin cells were subjected to constant-current charge until the voltage was at about 4.45 V at a rate of about 0.1 C, and then were subjected to a constant-voltage charge until the current became about 0.05 C maintaining the voltage at about 4.45 V and then were subjected to a constant-current discharge until the voltage was at about 3.0 V at a rate of about 0.1 C. In the third cycle, the coin cells were subjected to a constant-current charge until the voltage was at about 4.45 V at a rate of about 0.5 C, and then were subjected to a constant-voltage charge until the current became about 0.05 C maintaining the voltage at about 4.45 V and then were subjected to a constant-current discharge until the voltage was at about 3.0 V at a rate of about 0.2 C. In the third cycle, discharge capacity was considered as standard capacity.

In the fourth cycle, a charging operation was performed until the voltage was at about 4.45 V, at a rate of about 0.5 C, and then was subjected to a constant-voltage charge until the current arrives at about 0.05 C maintaining the voltage at about 4.45 V. Thereafter, the charged batteries were stored in an oven at a temperature of about 90° C. for about four hours, and then were removed to be discharged until the voltage was at about 3.0 V at a rate of about 0.2 C. Results of the charging and discharging operations are shown in Table 1 below. The capacity retention ratio after high temperature storage is expressed in the following Equation 1.

Capacity retention ratio after high temperature storage [%]=(discharge capacity after high temperature storage in the fourth cycle/standard capacity)×100 (standard cycle is a discharge capacity in the third cycle) <Equation 1>

Evaluation Example 6: Stability Experiment at a High Temperature of about 60° C.

The stability experiment was performed on coin cells manufactured according to Examples 101 to 106 and Comparative Examples 15 to 17 using the same method as in Evaluation Example 5 except that the charged batteries were stored in an oven at a temperature of about 60° C. for about seven days. Results of the charging and discharging operations are shown in Table 1 below. The capacity retention ratio after high temperature storage is expressed in Equation 1 above.

TABLE 1

|  | Capacity retention ratio after storage at 90° C. for 4 hours [%] | Capacity retention ratio after storage at 60° C. for 7 days [%] |
| --- | --- | --- |
| Comparative Example 15 | 90.4 | 89.0 |
| Comparative Example 16 | 91.2 | 89.6 |
| Comparative Example 17 | 90.2 | 90.2 |
| Example 101 | 98.1 | 86.9 |
| Example 102 | 97.4 | 94.6 |
| Example 103 | 99.8 | 97.9 |
| Example 104 | 98.4 | 95.9 |
| Example 105 | 98.5 | 96.5 |
| Example 106 | 99.2 | 100.2 |

As shown in Table 1, capacity retention ratios after high temperature storage of the lithium batteries of Examples 101 to 106 were generally improved in comparison with the lithium batteries of Comparative Examples 15 to 17.

Evaluation Example 7: High Temperature Charge/Discharge Experiment

The coin cells manufactured according to Examples 101 and 103 to 106 and Comparative Example 15 were charged/discharged fifty times with a constant current of about a 1 C rate in the voltage range of about 3.0 V to about 4.45 V in comparison with lithium metal at a high temperature of about 45 C. Life characteristics in the 50$^{th}$ cycle are shown in Table 2 below. The capacity retention ratio in the 50$^{th}$ cycle is calculated from the following Equation 2.

Capacity retention ratio in the 50$^{th}$ cycle [%]=(discharge capacity in the 50$^{th}$ cycle/discharge capacity in the 1$^{st}$ cycle×100           <Equation 2>

TABLE 2

|  | Retention ratio in 50$^{th}$ cycle [%] |
|---|---|
| Comparative Example 15 | 90.2 |
| Example 101 | 92.5 |
| Example 103 | 97.1 |
| Example 104 | 96.9 |
| Example 105 | 97.7 |
| Example 106 | 94.5 |

As shown in Table 2, the lithium batteries of Examples 101 and 103 to 106 showed improved high temperature life characteristics in comparison with the lithium battery of Comparative Example 15.

Evaluation Example 8: High Rate Characteristics Experiment

Figure 4:
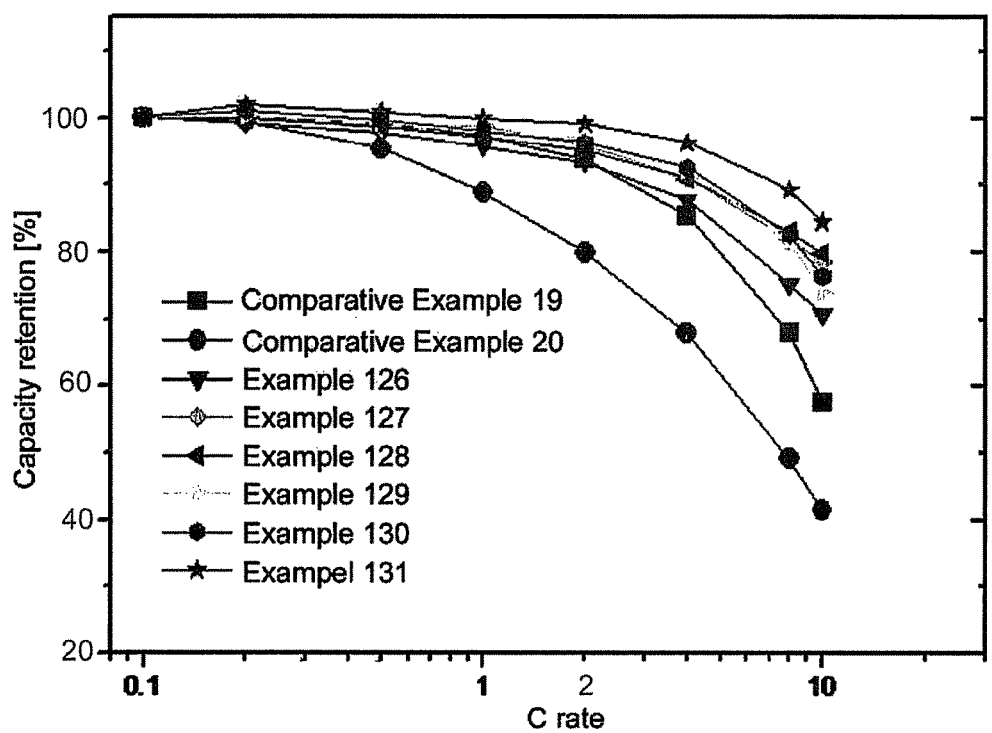
FIG. 4 illustrates results of high rate characteristics experiment on the lithium batteries manufactured according to embodiments 126 to 131 and Comparative Example 19 and 20.

The coin cells manufactured according to Examples 126 to 131 and Comparative Examples 19 and 20 were charged with a constant current of about 1 C rate in the voltage range of about 3.0 V to about 4.45 V in comparison with lithium metal at room temperature. The capacity retention ratio as a function of increased current density is shown in FIG. 4. Current densities during discharge were at the rate of about 0.1 C, 0.2 C, 0.5 C, 1 C, 2 C, 5 C, and 10 C. In FIG. 4, the capacity retention is calculated from the following Equation 3.

Capacity retention ratio for each rate [%]=(discharge capacity for each rate/discharge capacity at 0.1 C)×100           <Equation 3>

As shown in FIG. 4, high rate characteristics of the lithium batteries of Examples 126 to 131 were improved in comparison with the lithium batteries of Comparative Examples 19 and 20.

As described above, according to one or more of the above Examples of the present invention, since the core capable of occluding and emitting lithium is surface-treated with the spinel-structured lithium-free oxide, high temperature stability, high temperature life characteristics, and high rate characteristics of a lithium battery may be improved.

It should be understood that the exemplary embodiments described therein should be considered in a descriptive sense only and not for purposes of limitation. Descriptions of features or aspects within each embodiment should typically be considered as available for other similar features or aspects in other embodiments Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode active material, comprising:
a core capable of occluding and emitting lithium; and
a surface treatment layer formed on at least a portion of a surface of the core, wherein the surface treatment layer comprises a lithium-free oxide having a spinel structure, wherein the lithium-free oxide is one or more oxides selected from the group consisting of $SnMg_2O_4$, $SnZn_2O_4$, $MoAl_2O_4$, $CuAl_2O_4$, $ZnV_2O_4$, $TiMn_2O_4$, $NiAl_2O_4$, $ZnGa_2O_4$, $CaGa_2O_4$, $TiMg_2O_4$, $VMg_2O_4$, $FeV_2O_4$, $ZnV_2O_4$, $MgCr_2O_4$, $FeCr_2O_4$, $CoCr_2O_4$, $NiCr_2O_4$, $CuCr_2O_4$, $CdCr_2O_4$, $TiMn_2O_4$, $TiFe_2O_4$, $CoFe_2O_4$, $CdFe_2O_4$, $AlFe_2O_4$, $PbFe_2O_4$, $TiCo_2O_4$, $ZnCo_2O_4$, $SnCo_2O_4$, $FeNi_2O_4$, $GeNi_2O_4$, $ZnRh_2O_4$, $TiZn_2O_4$, $SrAl_2O_4$, $CrAl_2O_4$, $MoAl_2O_4$, $FeAl_2O_4$, $CoAl_2O_4$, $ZnGa_2O_4$, $CaIn_2O_4$, $FeIn_2O_4$, $CoIn_2O_4$, $NiIn_2O_4$, $CdIn_2O_4$, and $HgIn_2O_4$.

2. The electrode active material of claim 1, wherein the lithium-free oxide does not occlude and emit lithium.

3. The electrode active material of claim 1, wherein in an X-ray diffraction spectrum of the electrode active material, I(111)/I(311), which is a ratio of peak intensity of a (111) crystal face to peak intensity of a (311) crystal face, is about 0.3 or more.

4. The electrode active material of claim 1, wherein in an X-ray diffraction spectrum of the electrode active material, I(111)/I(400), which is a ratio of peak intensity of a (111) crystal face to peak intensity of a (400) crystal face, is about 0.6 or more.

5. The electrode active material of claim 1, wherein the content of the lithium-free oxide is less than about 10 wt % on a basis of a total weight of the electrode active material.

6. The electrode active material of claim 1, wherein the content of the lithium-free oxide is less than about 5 wt % on a basis of a total weight of the electrode active material.

7. The electrode active material of claim 1, wherein the surface treatment layer comprises two or more elements selected from the group consisting of a metal and a metalloid with an atomic weight of 9 or more.

8. The electrode active material of claim 7, wherein the elements are selected from the group consisting of Sn, Mg, Mo, Cu, Zn, Ti, Ni, Ca, Al, V, Mn, Ga, Fe, Cr, Rh, In, Pb, Co, Ge, Cd, Hg, Sr, W and Be.

9. The electrode active material of claim 1, wherein the composition ratio of oxygen to the two or more elements selected from the group consisting of metal and metalloid with an atomic weight of 9 or more is about 4:2.1 to about 4:3.9 in the surface treatment layer.

10. The electrode active material of claim 1, wherein the thickness of the surface treatment layer is about 1 Å to about 1 μm.

11. The electrode active material of claim 1, wherein the core further comprises a cathode active material.

12. The electrode active material of claim 1, wherein the core further comprises a lithium transition metal oxide.

13. The electrode active material of claim 1, wherein the core further comprises compounds expressed as Chemical formulas 2 and 3:

$$Li[Li_aMe_{1-a}]O_{2+d} \quad \text{<Chemical formula 2>}$$

$$Li[Li_bMe_cM'_e]O_{2+d}, \quad \text{<Chemical formula 3>}$$

where $0<a<1$, $b+c+e=1$; $0<b<1$, $0<e<0.1$; $0\le d\le 0.1$,

Me is one or more metals selected from the group consisting of Ti, V, Cr, Mn, Fe, Co, Ni, Cu, Al, Mg, Zr, and B, and M' is one or more metals selected from the group consisting of Mo, W, Ir, Ni, and Mg.

14. The electrode active material of claim 1, wherein the core further comprises compounds expressed as Chemical formulae 4 to 8:

$$Li_xCo_{1-y}M_yO_{2-\alpha}X_\alpha \quad \text{<Chemical formula 4>}$$

$$Li_xCo_{1-y-z}Ni_yM_zO_{2-\alpha}X_\alpha \quad \text{<Chemical formula 5>}$$

$$Li_xMn_{2-y}M_yO_{4-\alpha}X_\alpha \quad \text{<Chemical formula 6>}$$

$$Li_xCo_{2-y}M_yO_{4-\alpha}X_\alpha \quad \text{<Chemical formula 7>}$$

$$Li_xMe_yM_zPO_{4-\alpha}X_\alpha, \quad \text{<Chemical formula 8>}$$

where $0.90\le x\le 1.1$, $0\le y\le 0.9$, $0\le z\le 0.5$, $1-y-z>0$, $0\le\alpha\le 2$, Me is one or more metals selected from the group consisting of Ti, V, Cr, Mn, Fe, Co, Ni, Cu, Al, Mg, Zr, and B, M is one or more elements selected from the group consisting of Mg, Ca, Sr, Ba, Ti, Zr, Nb, Mo, W, Zn, Al, Si, Ni, Mn, Cr, Fe, Mg, Sr, V, and rare-earth elements, and X is an element selected from the group consisting of O, F, S, and P.

15. The electrode active material of claim 1, wherein the core further comprises compounds expressed as Chemical formulas 9 and 10:

$$pLi_2MO_3\text{-}(1-p)LiMeO_2 \quad \text{<Chemical formula 9>}$$

$$xLi_2MO_{3-y}LiMeO_2\text{-}zLi_{1+d}M'_{2-d}O_4, \quad \text{<Chemical formula 10>}$$

where $0<p<1$, $x+y+z=1$; $0<x<1$, $0<y<1$, $0<z<1$; $0\le d\le 0.33$,

M is one or more elements selected from the group consisting of Mg, Ca, Sr, Ba, Ti, Zr, Nb, Mo, W, Zn, Al, Si, Ni, Mn, Cr, Fe, Mg, Sr, V, and rare-earth elements, Me is one or more metals selected from the group consisting of Ti, V, Cr, Mn, Fe, Co, Ni, Cu, Al, Mg, Zr, and B, and M' is one or more metals selected from the group consisting of Ti, V, Cr, Mn, Fe, Co, Ni, Cu, Al, Mg, Zr, and B.

16. The electrode active material of claim 1, wherein the core further comprises an anode active material.

17. The electrode active material of claim 1, wherein the core further comprises one or more materials selected from the group consisting of lithium metal, metal which is alloyable with lithium, transition metal oxide, non-transition metal oxide, and carbon material.

18. The electrode active material of claim 1, wherein the core further comprise one or more materials selected from the group consisting of Si, Sn, Al, Ge, Pb, Bi, Sb, Si-T alloy, Sn—Z alloy, lithium titanium oxide, vanadium oxide, lithium vanadium oxide, $SnO_2$, $SiO_x$ ($0<x<2$), natural graphite, artificial graphite, soft carbon, hard carbon, mesophase pitch carbide, and fired coke, wherein T and Z are Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

19. The electrode active material of claim 1, wherein the surface treatment layer is formed by contacting a spinel-structured lithium-free oxide or a precursor thereof with the core.

20. An electrode comprising an electrode active material according to claim 1.

21. The electrode of claim 20, wherein the electrode is a cathode.

22. The electrode of claim 20, wherein the electrode is an anode.

* * * * *